(12) United States Patent
Love

(10) Patent No.: US 9,593,801 B2
(45) Date of Patent: Mar. 14, 2017

(54) WATER JUG ATTACHMENT

(71) Applicant: Michael Love, Paramount, CA (US)

(72) Inventor: Michael Love, Paramount, CA (US)

(*) Notice: Subject to any disclaimer, the term of this patent is extended or adjusted under 35 U.S.C. 154(b) by 82 days.

(21) Appl. No.: 14/527,728

(22) Filed: Oct. 29, 2014

(65) Prior Publication Data
US 2015/0115113 A1 Apr. 30, 2015

Related U.S. Application Data

(60) Provisional application No. 61/896,835, filed on Oct. 29, 2013.

(51) Int. Cl.
B67D 7/84 (2010.01)
F16M 11/38 (2006.01)
B67D 3/00 (2006.01)
B65D 25/28 (2006.01)

(52) U.S. Cl.
CPC ............ *F16M 11/38* (2013.01); *B67D 3/0051* (2013.01); *B67D 3/0083* (2013.01); *B65D 25/2882* (2013.01)

(58) Field of Classification Search
CPC ........ B67D 2210/00097; B67D 3/0051; B67D 3/0083; B67D 3/00
See application file for complete search history.

(56) References Cited

U.S. PATENT DOCUMENTS

| | | | | |
|---|---|---|---|---|
| 533,687 A * | 2/1895 | Walker | ................ | B67D 1/0891 222/166 |
| 1,458,521 A * | 6/1923 | Castile | ................... | B65G 65/24 248/139 |
| 1,595,329 A * | 8/1926 | Wheatley | ............ | B67D 3/0083 222/166 |
| 1,814,342 A * | 7/1931 | Smith | ................... | B67D 3/0029 108/8 |
| 4,121,800 A * | 10/1978 | McClellan | ............. | F16M 13/02 248/301 |
| 4,860,986 A * | 8/1989 | Couzens | ................ | B60N 3/103 248/310 |
| 5,127,618 A * | 7/1992 | Page | .................... | B67D 3/0029 222/146.6 |
| 6,047,866 A * | 4/2000 | Brown | .................... | B05B 9/007 222/481 |
| 6,196,263 B1 * | 3/2001 | Woodruff | ................ | G01F 13/00 137/565.11 |
| 6,379,034 B1 * | 4/2002 | Schutz | ................... | B65G 65/23 222/166 |
| 6,386,393 B1 * | 5/2002 | Paulovich | ............ | B67D 3/0083 211/80 |
| 6,745,869 B2 * | 6/2004 | Garrett | ................. | B23D 45/003 182/45 |
| 6,926,241 B2 * | 8/2005 | Garrett | ................. | B23D 45/003 182/107 |

(Continued)

Primary Examiner — Bradley Duckworth
(74) Attorney, Agent, or Firm — Ruth Eure; Emery Tracy

(57) ABSTRACT

The water jug attachment is an essentially rectangular support device wherein the rectangular device is supported by three legs, wherein the single rear leg is mounted in the center of the back of the rectangular device and operates as a jack in order to lift and support the rear of the jug and tilt it toward the spout or spigot as the volume in the jug declines due to use allowing the water in the jug to pour out of the spigot.

7 Claims, 2 Drawing Sheets

(56) References Cited

U.S. PATENT DOCUMENTS

| | | | | |
|---|---|---|---|---|
| 7,275,662 B1* | 10/2007 | Milcetich | ............. | B67D 3/0083 |
| | | | | 211/74 |
| 8,011,622 B1* | 9/2011 | Guthrie | ................. | B65G 65/24 |
| | | | | 224/164 |
| 8,313,007 B2* | 11/2012 | Kpabar | ................ | B67D 3/0009 |
| | | | | 220/592.18 |
| 2005/0173190 A1* | 8/2005 | Garrett | ................ | B23D 45/003 |
| | | | | 182/45 |
| 2008/0121766 A1* | 5/2008 | Jorgensen | ............ | B67D 3/0083 |
| | | | | 248/150 |

* cited by examiner

WATER JUG ATTACHMENT

CLAIM OF PRIORITY

This patent application claims priority under 35 USC 119(e)(1) from U.S. Provisional Patent Application Ser. No. 61/896,835 filed Oct. 29, 2013, of common inventorship herewith entitled, "Water Jug Attachment," which is incorporated herein by reference as though the same were set forth in its entirety.

BACKGROUND OF THE INVENTION

Field of the Invention

This invention relates generally to a water jug attachment and, more particularly, the invention relates to water jug attachment making multi-gallon water jugs easier to handle and use without undue strain or water spillage.

Description of the Prior Art

Along with food, shelter, and warmth, water is one the necessities for human life. In localities where the water-quality is suspect, many people rely upon bottled water or upon water coolers, or multi-gallon jerrican or "fort-pak"-style plastic dispensers: essentially rectangular box-like jugs equipped with a handle, and a spout or spigot, and designed to be laid on a tabletop, refrigerator, or counter, with the spout or spigot protruding over the edge. Now, while the water-jugs described above are essential items to every household, they also present something of a problem in their actual use: they are heavy, awkward, and cumbersome, and as the volume drops in the jug, the user must lift the rear of the jug to tilt it forward while also attempting to manage the spigot and the cup, pot, or other vessel he or she is attempting to fill with water. Easy enough to do with two pairs of hands, perhaps, but nearly impossible to do on one's own and likely to result in spillage, wasted water, and frustration.

BRIEF DESCRIPTION OF THE DRAWINGS

FIG. 3 also shows adjustable length front legs.

DETAILED DESCRIPTION OF THE PREFERRED EMBODIMENTS

Figure 1:
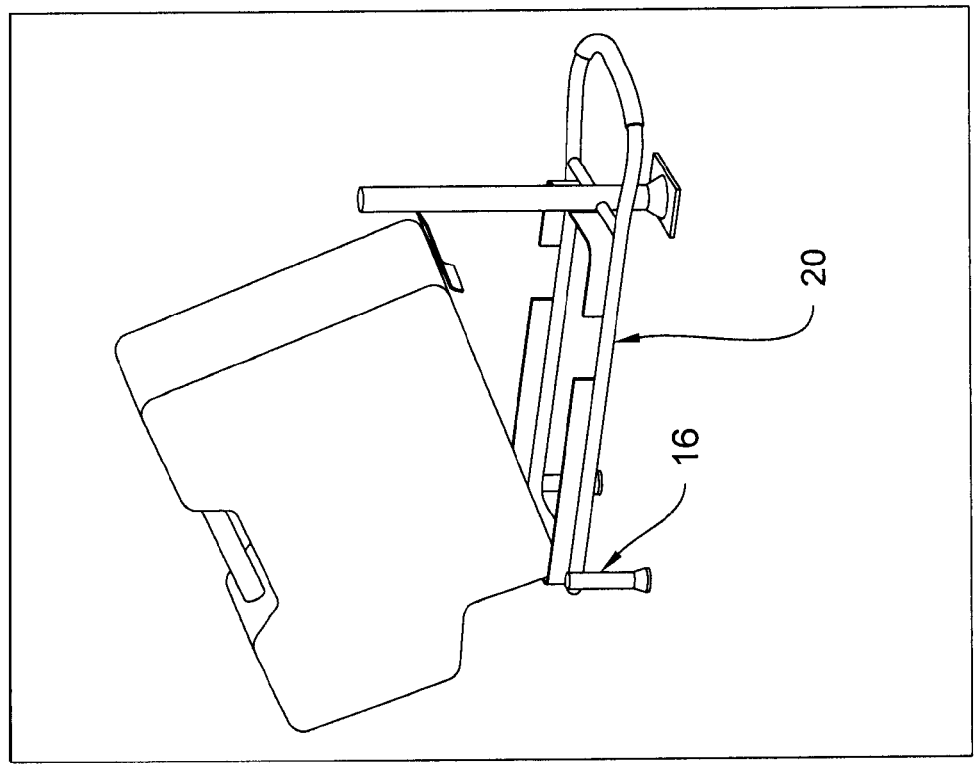
FIG. 1 is a side perspective view illustrating a water jug attachment, constructed in accordance with the present invention holding a water jug having the rear of the jug tipped up to allow the water in the jug to allow the water to pour out of the spigot.
Figure 2:
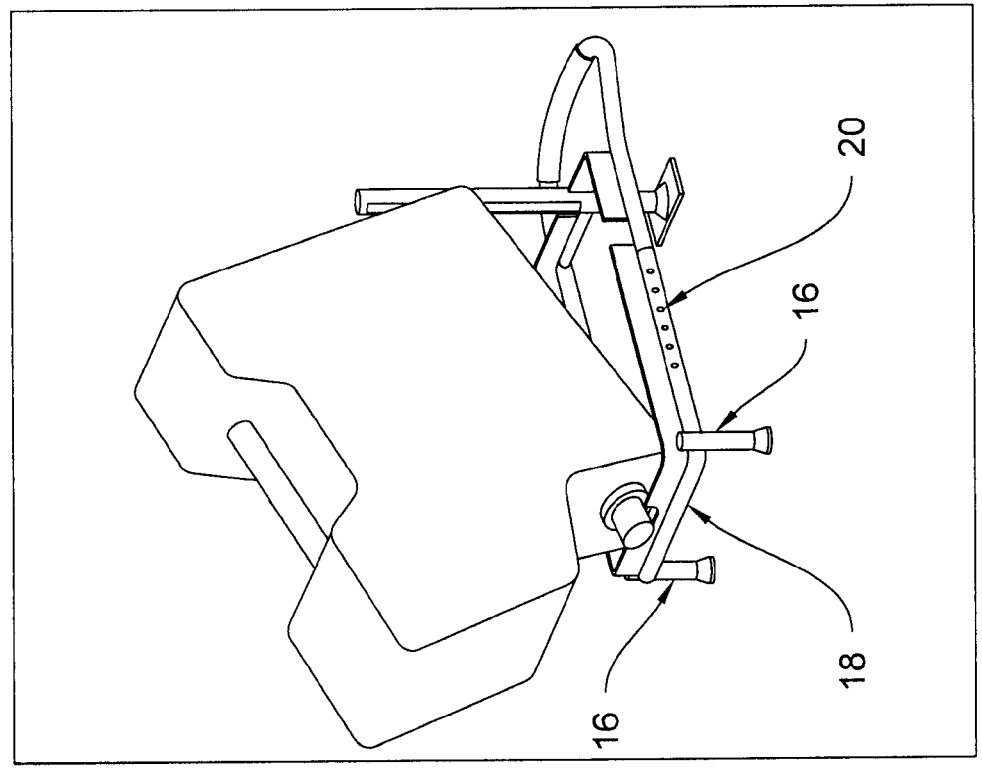
FIG. 2 is a rear perspective view illustrating a water jug attachment, constructed in accordance with the present invention holding a water jug having the rear of the jug tipped up to allow the water in the jug to allow the water to pour out of the spigot.

As illustrated in FIGS. 1-4, the present invention is a water jug attachment comprising a water jug support device making multi-gallon water jugs easier to handle and use without undue strain or water spillage.

The water jug attachment 10 of the present invention is an essentially rectangular support device wherein the rectangular device is supported by three legs. The rectangular device has a front, two sides and a back. The single rear leg 12 is mounted in the center of the back of the rectangular device and operates as a jack in order to lift and support the rear of the jug and tilt it toward the spout or spigot as the volume in the jug declines due to use allowing the water in the jug to pour out of the spigot. The water jug attachment is constructed primarily of PVC tubing and aluminum, and is a horizontally oriented, essentially rectangular three-legged rack designed to support a 2½ gallon jerrican-style water jug. The water jug attachment features two short, peg-like PVC legs 16 at the front corners of the rectangular device, connected by a front cross-bar 18 or tube which will support the front, spigot-end of the jug. The long sides of the rectangular device comprise a pair of adjustable length tubes or rails 20 extending back horizontally and parallel from atop each of the two front legs 16, and these rails 20 or tubes are perforated at regular intervals with a row of holes, for adjusting the length of the rails 20.

A bail-like, half-hoop attachment 28 fits adjustably into the side rails 20 and serves as a handle, and locks into place to adjust the length of the device to accommodate the size of the water jug; additionally. Adjusting the length of the side rails 20 also adjusts the length of handle 28.

Figure 3:
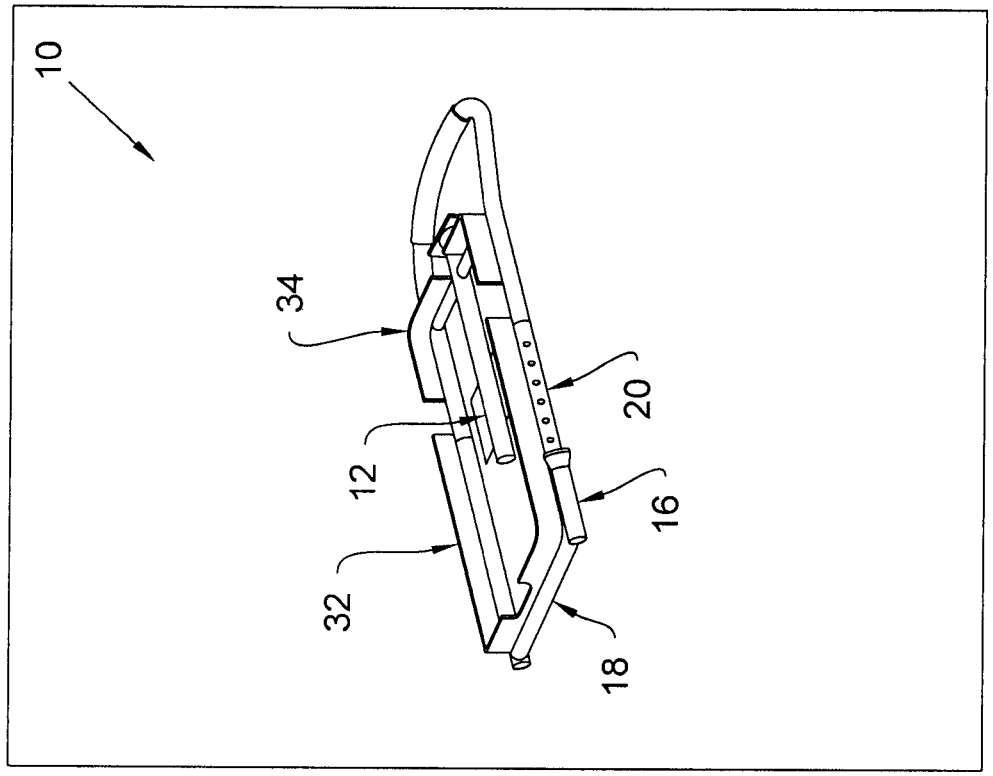
FIG. 3 is a side perspective view illustrating a water jug attachment, constructed in accordance with the present invention showing the riser which supports the rear of the jug to allow the jug to be raised to allow the water in the jug to allow the water to pour out of the spigot.
Figure 4:
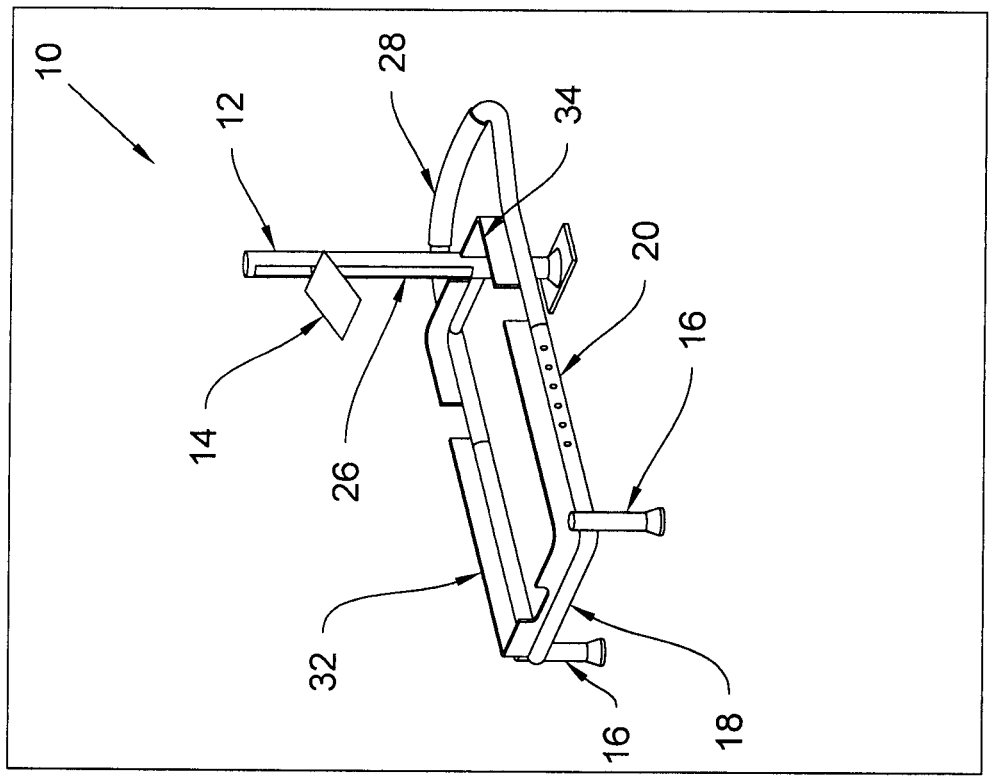
FIG. 4 is a side perspective view illustrating a water jug attachment, constructed in accordance with the present invention in its folded position.

Rear support leg 12, comprises an approximately 16-inch in length, larger diameter PVC tube, comprising a longitudinal slot or slit 26 along its length on the forward side of support leg 12. This slot 26 is fitted with a sliding and locking, leverage-activated support-mount riser 14 that will be raised and locked to tilt and support the aft end of the water jug when tilting it is necessary due to falling volume. As shown in FIG. 3, front support legs 16 are adjustable in height. Riser 14 attaches in slit 26 of third support leg 12. Side rails 20, and front cross-bar 18, support a bail-like, half-hoop attachment 32, or simply front bail 32, for securing the jug onto the front of the device 10. A similar rear bail like attachment 34, or rear bail 34 is mounted near the rear of the side rails 20 to support the rear of the water jug and snaps and lock into the side-to-side holes in the rack's side rails 20. Rear bail 34 loops back around the third support leg 12. The top, or outer arc 28, functions as a handle, and is encased in a soft, non-slip foam rubber or similar material, and this arc 28 is designed to press snugly against a wall and thus provide resistance to the leverage that otherwise results in the water jug attachment's tipping itself forward off the counter. The front bail 32 and rear bail 34 are adjustable in length so that the water jug attachment may be used effectively with water jugs and countertops of varying widths. It is adjustable to any size water jug or countertop or table and the rear of the attachment, where the jug sets on, adjusts to any different size jug. The handle adjusts to the wall to prevent the jug and attachment sliding back.

The water jug attachment of the present invention enables users to enjoy the benefits of using multi-gallon, jerrican- or fort-pak-style water jugs, without experiencing the tendency of these jugs to be cumbersome, unwieldy, and susceptible to water spills. The water jug attachment, by supporting the jug in a stable cradle, and incorporating a sliding, leverage-activated locking support to lift and tilt the jug as needed, and to do so in a secure and stable manner, renders multi-gallon jugs far easier to handle and use, and far less likely to result in spills. Easy to set up and adjust to fit the variety and size of jerrican and fort pak style jugs on the market, and eminently affordable, the water jug attachment lasts for many years, and require nothing more in the way of maintenance than a periodic wipe down with a damp cloth. Clearly, the general user household populace, and in particular those who enjoy fresh water and saving money by buying larger containers.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

The invention claimed is:

1. A water jug support device comprising an essentially horizontally disposed rectangular support device wherein the rectangular device is supported by three legs, having two legs in the front and a single rear leg, further wherein the rectangular device has a front, two sides and a back, further wherein the single rear leg mounted near the center of the back of the rectangular device and, wherein the rear support leg supports a riser, further the front of the rectangular device comprise a front cross-bar capable of supporting the front, spigot-end of a water jug, further wherein the long sides of the rectangular device comprise a pair of adjustable length rails extending back horizontally and parallel from atop each of the two front legs, further wherein the rails are perforated at regular intervals with a row of holes, for adjusting the length of the rails, further wherein an arc attachment fits adjustably into the side rails and serves as a handle; additionally, the side rails, and the front cross-bar support a front bail, for securing the jug onto the front of the device, further wherein the side rails and the back of the rectangular device support a rear bail.

2. The water jug support device of claim 1 wherein the riser of the rear support leg comprises an approximately 16-inch in length tube comprising a longitudinal slot or slit along its length on the forward side of the support leg, wherein the slot is fitted with a sliding and locking, leverage-activated support-mount riser that is capable of being raised and locked into place to tilt and support the aft end of the water jug when tilting it is necessary due to falling volume.

3. The water jug support device of claim 1, wherein the front support legs are adjustable in height.

4. The water jug support device of claim 2, wherein the front support legs are adjustable in height.

5. The water jug support device of claim 1, wherein the arc attachment is encased in a soft, non-slip foam rubber and the arc attachment is designed to press snugly against a wall.

6. The water jug support device of claim 1, wherein a distance between the front bail and the rear bail is adjustable so that the device is capable of being used with water jugs and countertops of varying sizes.

7. The water jug support device of claim 2, wherein a distance between the front bail and the rear bail is adjustable so that the device is capable of being used with water jugs and countertops of varying sizes.

* * * * *